(12) United States Patent
Link et al.

(10) Patent No.: US 11,040,473 B2
(45) Date of Patent: Jun. 22, 2021

(54) SYSTEMS AND METHODS FOR OPERATING AN INJECTION MOLDING MACHINE

(71) Applicant: Niigon Machines Ltd., Vaughan (CA)

(72) Inventors: Carsten Link, Burlington (CA); Luke Osmokrovic, Toronto (CA); Yongchuan Fan, Toronto (CA)

(73) Assignee: Niigon Machines Ltd., Vaughan (CA)

(*) Notice: Subject to any disclaimer, the term of this patent is extended or adjusted under 35 U.S.C. 154(b) by 353 days.

(21) Appl. No.: 16/248,162

(22) Filed: Jan. 15, 2019

(65) Prior Publication Data

US 2019/0143572 A1 May 16, 2019

Related U.S. Application Data

(63) Continuation of application No. PCT/CA2017/050864, filed on Jul. 18, 2017.

(60) Provisional application No. 62/363,519, filed on Jul. 18, 2016.

(51) Int. Cl.
*B29C 45/42* (2006.01)
*B29C 45/76* (2006.01)
(Continued)

(52) U.S. Cl.
CPC ...... *B29C 45/7626* (2013.01); *B29C 45/4005* (2013.01); *B29C 45/64* (2013.01);
(Continued)

(58) Field of Classification Search
CPC . B29C 45/17; B29C 45/1705; B29C 45/1773; B29C 45/1784; B29C 45/1785;
(Continued)

(56) References Cited

U.S. PATENT DOCUMENTS

| 4,731,014 A | 3/1988 | Von Holdt |
|---|---|---|
| 5,250,239 A | 10/1993 | Herbst |

(Continued)

FOREIGN PATENT DOCUMENTS

| CA | 2567134 A1 | 5/2008 |
|---|---|---|
| CN | 203185569 U | 9/2013 |

(Continued)

OTHER PUBLICATIONS

International Search Report and Written Opinion of corresponding International Application No. PCT/CA2017/050864 dated Oct. 12, 2017.

*Primary Examiner* — Joseph S Del Sole
*Assistant Examiner* — Thu Khanh T Nguyen
(74) *Attorney, Agent, or Firm* — Bereskin & Parr LLP/S.E.N.C.R.L., s.r.l.

(57) ABSTRACT

A method of operating an injection molding machine includes translating a movable platen from a closed position to a part transfer position by overshooting the transfer position in an opening direction away from a stationary platen to an over-travel position, and then translating the moving platen back to the transfer position in a closing direction, opposite the opening direction. Movement of a take-out device towards an advanced position, in which the take-out device reaches between mold halves carried by the stationary and movable platens, occurs while the movable platen is moving between the over-travel and transfer positions, prior to coming to rest in the transfer position. When resting in the transfer position, the method includes transferring molded articles from a first mold section mounted to the movable platen to retained engagement on the take-out device reaching between the platens.

24 Claims, 8 Drawing Sheets

(51) Int. Cl.
*B29C 45/64* (2006.01)
*B29C 45/40* (2006.01)

(52) U.S. Cl.
CPC .... *B29C 45/76* (2013.01); *B29C 2945/76568* (2013.01); *B29C 2945/76702* (2013.01); *B29C 2945/76722* (2013.01); *B29C 2945/76792* (2013.01); *B29C 2945/76795* (2013.01)

(58) Field of Classification Search
CPC ..... B29C 45/26; B29C 45/42; B29C 45/4241; B29C 45/4073; B29C 45/4068; B29C 45/40; B29C 45/4005
See application file for complete search history.

(56) References Cited

U.S. PATENT DOCUMENTS

| | | |
|---|---|---|
| 5,601,773 A | 2/1997 | Schmidt et al. |
| 6,315,543 B1 * | 11/2001 | Lausenhammer ...... B29C 45/42 264/334 |
| 6,322,733 B1 | 11/2001 | Herbst |
| 6,325,955 B1 | 12/2001 | Herbst |
| 7,118,365 B2 * | 10/2006 | Shirahata ............ B29C 45/7626 425/139 |
| 7,695,266 B2 | 4/2010 | MacDonald et al. |
| 8,974,716 B2 | 3/2015 | Schad et al. |
| 2006/0078645 A1 | 4/2006 | Seidel et al. |
| 2006/0083814 A1 | 4/2006 | Mai |

FOREIGN PATENT DOCUMENTS

| | | |
|---|---|---|
| DE | 102009014454 A1 | 11/2009 |
| EP | 0205710 A2 | 12/1986 |
| EP | 1369216 A1 | 12/2003 |
| JP | S63265611 A | 11/1988 |
| JP | H03159718 A | 7/1991 |
| JP | H07227875 A | 8/1995 |
| JP | 4727379 B2 | 7/2011 |

* cited by examiner

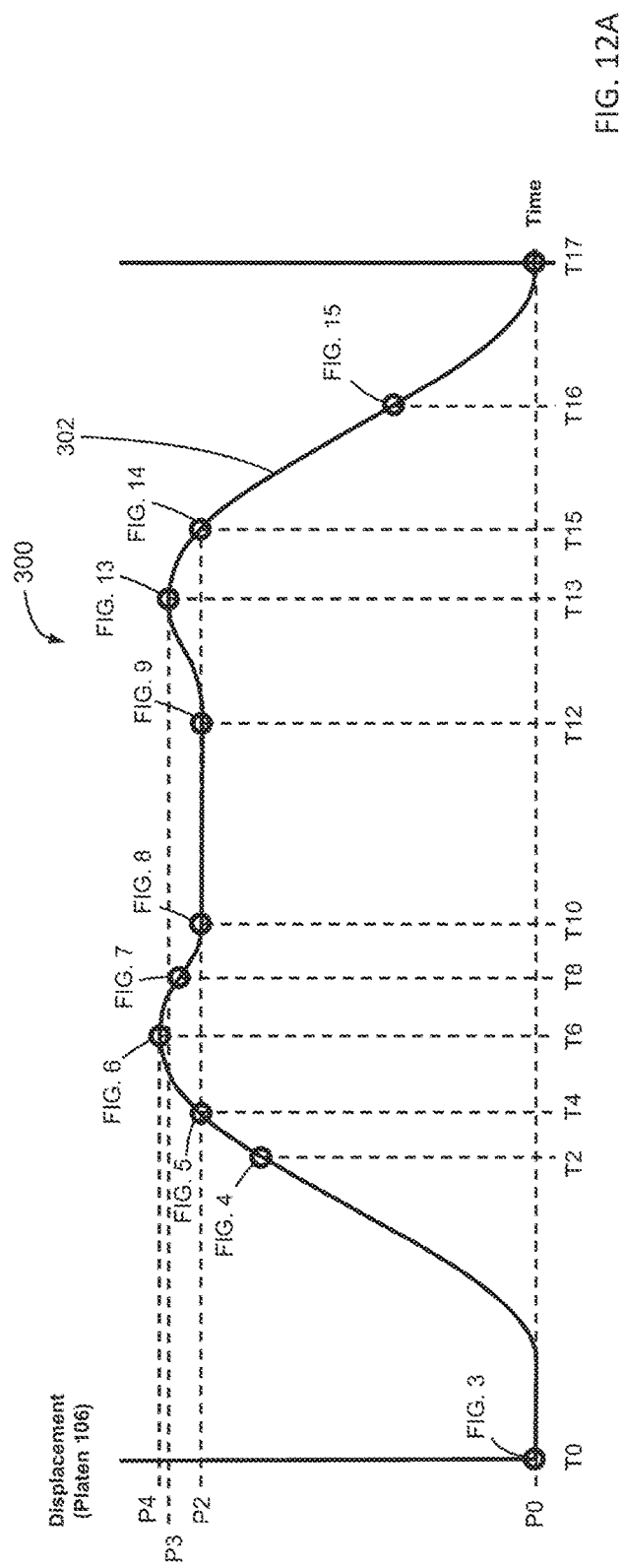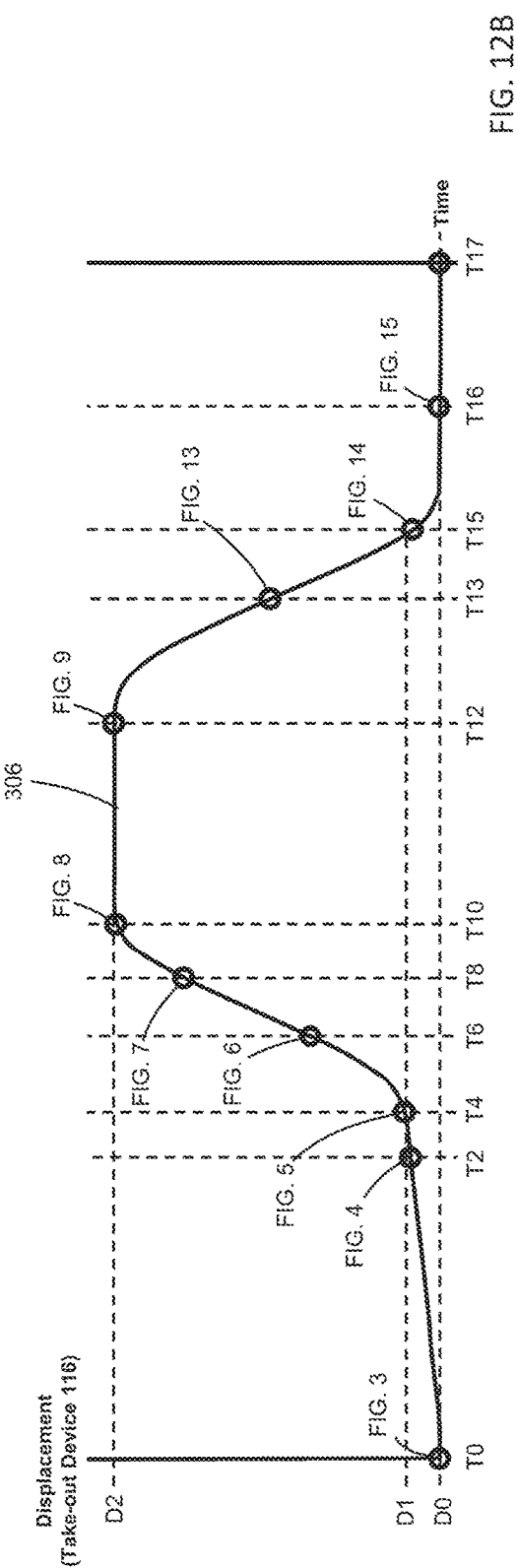

SYSTEMS AND METHODS FOR OPERATING AN INJECTION MOLDING MACHINE

This application is a continuation of PCT Application Serial No. PCT/CA2017/050864, filed Jul. 18, 2017, which claims the benefit of U.S. Provisional Application Ser. No. 62/363,519, filed Jul. 18, 2016, which is hereby incorporated herein by reference.

FIELD

The specification relates generally to injection molding, and more specifically, to systems and methods for moving and positioning platens, take-out devices, and/or other components in an injection molding machine.

BACKGROUND

U.S. Pat. No. 5,250,239 (Herbst) discloses detecting the opening movement of the mold and/or the extraction movement of the handling device in relation to position and speed in order to control the opening and closing movement of an injection mold and the feed and extraction movement of a handling device for the removal of the molding in a manner which is optimally concerted with no delay. If the speed lies in a reference range, a release signal is generated which triggers the feed movement of the gripping device or the closing movement of the mold.

U.S. Pat. No. 6,322,733 (Herbst) discloses a method and an apparatus for controlling a motional sequence of a first movable component of a plastic material injection molding machine having a first trajectory spatially overlapping at least partially a second trajectory of a second movable component of the plastic material injection molding machine. Motion of the first movable component is initiated depending on an enabling signal indicative for a motional state of the second movable component.

U.S. Pat. No. 6,325,955 (Herbst) discloses a plastic material injection molding machine comprising a mold with at least one movable mold portion and a movable handling system. The handling system is adapted to be moved along a predetermined trajectory and to enter between mold portions when the mold is in an open operational position. The movable mold portion has a front surface facing the handling system and defines a collision contour with respect to the handling system when the latter is moved along the trajectory during movement of the mold portion. The handling system is adapted to pass by the collision contour after the movable mold portion has moved away from the trajectory. The handling system is moved along a first path section of the trajectory before passing by the collision contour and is accelerated up to a predetermined maximum velocity. Thus, the handling system is at the maximum velocity when passing by the collision contour. The handling system is then decelerated along a second path section of the trajectory essentially to a standstill at a predetermined position between the mold portions.

SUMMARY

The following summary is intended to introduce the reader to various aspects of the applicant's teaching, but not to define any invention.

According to some aspects of the teaching disclosed herein, a method of operating an injection molding machine includes translating a movable platen from a closed position to a part transfer position by overshooting the transfer position in an opening direction away from a stationary platen to an over-travel position, and then translating the moving platen back to the transfer position in a closing direction, opposite the opening direction. Movement of a take-out device towards an advanced position, in which the take-out device reaches between mold halves carried by the stationary and movable platens, occurs while the movable platen is moving between the over-travel and transfer positions, prior to coming to rest in the transfer position. When resting in the transfer position, the method includes completing transfer of molded articles from a first mold section mounted to the movable platen to retained engagement on the take-out device reaching between the platens.

According to some aspects, a method of operating an injection molding machine includes: (a) releasing a clamp pressure holding a first mold section and a second mold section together. The first mold section is mounted to a movable platen and the second mold section is mounted to a stationary platen. The method further includes (b) translating the movable platen in an opening direction away from the stationary platen to open the mold. The translating step includes translating the movable platen from a mold-closed position to an over-travel position spaced axially apart from the mold-closed position. The method further includes (c) translating the movable platen in a closing direction opposite the opening direction from the over-travel position to a transfer position axially intermediate the mold-closed position and the over-travel position; and (d) moving a take-out device from a retracted position to an advanced position. The take-out device is clear of the first and second mold sections when in the retracted position, and the take-out device reaches between the first and second mold sections when in the advanced position for receiving articles from the first mold section when the movable platen is in the transfer position. The method further includes (e) transferring articles from the first mold section to the take-out device. The articles are received in retained engagement in the take-out device when the take-out device is in the advanced position and the movable platen is in the transfer position.

In some examples, the movable platen has a maximum opening speed during a portion of the translation in step (b), and step (b) may include decelerating the movable platen from the maximum opening speed to zero speed at the over-travel position. In some examples, step (b) may include crossing the transfer position when translating in the opening direction towards the over-travel position, and initiating the decelerating of the movable platen prior to the movable platen reaching the transfer position when translating in the opening direction. In some examples, step (b) may include translating the movable platen across the transfer position at a transfer position opening speed. The transfer position opening speed may be at least 50 percent of the maximum opening speed.

In some examples, the take-out device sweeps a work envelope when moving between the advanced and retracted positions, and step (b) may include initiating the decelerating of the movable platen prior to the first mold section clearing the work envelope.

In some examples, at least a portion of the translation of the movable platen from the transfer position to the over-travel position in step (b) may occur simultaneously with at least a portion of the movement of the take-out device between the first and second mold sections in step (d).

In some examples, at least a portion of the translation of the movable platen from the over-travel position to the transfer position in step (c) may occur simultaneously with at least a portion of the movement of the take-out device between the first and second mold sections in step (d).

In some examples, the take-out device has a maximum advancing speed during a portion of the movement in step (d), and step (d) may include initiating deceleration of the take-out device from the maximum advancing speed to zero speed at the advanced position during translation of the movable platen in step (c).

In some examples, the method may further include initiating ejection of the molded articles from the first mold section prior to the movable platen reaching the transfer position in step (c).

In some examples, when the movable platen is in the transfer position, the first and second mold sections are spaced axially apart by a clearance spacing, and the take-out device has an axial extent intermediate the first and second mold sections when in the advanced position. The axial extent may be at least 70 percent of the clearance spacing.

In some examples, the method may further include: (f) after step (e), moving the take-out device from the advanced position to the retracted position; (g) during step (f), translating the movable platen in the opening direction from the transfer position to a pre-closing position spaced axially apart from the transfer position; and (h) after step (g), translating the movable platen in the closing direction from the pre-closing position to the mold-closed position. At least a portion of the translation of the movable platen in step (h) may occur prior to the take-out device clearing the first and second mold sections during step (f).

In some examples, the pre-closing position may be axially intermediate the transfer position and the over-travel position.

In some examples, step (h) may include translating the movable platen across the transfer position at a transfer position closing speed. The transfer position closing speed may be generally equal to a maximum speed of the movable platen when translating from the pre-closing position to the transfer position in step (h). In some examples, step (h) may include accelerating the movable platen from zero speed at the pre-closing position to the transfer position closing speed at the transfer position.

According to some aspects, a method of operating an injection molding machine includes: (a) translating a movable platen in a closing direction towards a stationary platen, from an over-travel position to a transfer position; and (b) when the movable platen is in the transfer position, transferring molded articles from a first mold section mounted to the movable platen to retained engagement on a take-out device reaching between the platens.

In some examples, the transfer position in step (b) may be achieved as a result of completion of step (a). In some examples, after step (b) the movable platen may be translated further in the closing direction to a mold-closed position for forming a subsequent set of articles. In some examples, prior to step (a), the movable platen may be translated in an opening direction across the transfer position at a transfer position opening speed. The opening direction is opposite the closing direction.

According to some aspects, a method of operating an injection molding machine includes: (a) releasing a clamp pressure holding a first mold section and a second mold section together. The first mold section is mounted to a movable platen and the second mold section is mounted to a stationary platen. The method further includes (b) translating the movable platen from a mold-closed position to a transfer position to open the mold. The transfer position is spaced axially apart from the mold-closed position in an opening direction. The method further includes (c) moving a take-out device from a retracted position to an advanced position. The take-out device is clear of the first and second mold sections when in the retracted position, and the take-out device reaches between the first and second mold sections when in the advanced position for receiving articles from the first mold section when the movable platen is in the transfer position. The method further includes (d) transferring articles from the first mold section to the take-out device. The articles are received in retained engagement in the take-out device when the take-out device is in the advanced position and the movable platen is in the transfer position. The method further includes (e) after step (d), moving the take-out device from the advanced position to the retracted position; (f) during step (e), translating the movable platen in the opening direction from the transfer position to a pre-closing position spaced axially apart from the transfer position; and (g) after step (f), translating the movable platen in a closing direction opposite the opening direction from the pre-closing position to the mold-closed position. At least a portion of the translation of the movable platen in step (g) occurs prior to the take-out device clearing the first and second mold sections during step (e).

In some examples, step (g) may include translating the movable platen across the transfer position at a transfer position closing speed. The transfer position closing speed may be generally equal to a maximum speed of the movable platen when translating from the pre-closing position to the transfer position in step (g). In some examples, step (g) may include accelerating the movable platen from zero speed at the pre-closing position to the transfer position closing speed at the transfer position.

According to some aspects, a method of operating an injection molding machine includes: (a) translating a movable platen in a closing direction to a mold-closed position for closing a mold; (b) after step (a), translating the movable platen in an opening direction away from the stationary platen; and (c) after step (b), translating the movable platen in the closing direction toward a transfer position for transferring molded articles from a mold section mounted to the movable platen to retained engagement on a take-out device reaching between the platens.

In some examples, step (b) may include translating the movable platen from the mold-closed position to an over-travel position spaced axially apart from the mold-closed position, and step (c) may include translating the movable platen from the over-travel position to a stop at the transfer position.

In some examples, step (b) may include translating the movable platen from the transfer position to a pre-closing position spaced axially apart from the transfer position, and step (c) may include translating the movable platen from the pre-closing position to the transfer position. The movable platen may reach the transfer position in step (c) at a transfer position closing speed. The transfer position closing speed may be generally equal to a maximum speed of the movable platen during translation from the pre-closing position to the transfer position in step (c).

Other aspects and features of the present specification will become apparent, to those ordinarily skilled in the art, upon review of the following description of the specific examples of the specification.

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIG. 12A is a graph showing displacement with respect to time of a platen structure of the machine of FIG. 1 according to an alternative example method;

FIG. 12B is a graph showing corresponding displacement with respect to time of a take-out device structure of the machine of FIG. 1 according to the method of FIG. 12A;

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Figure 1:
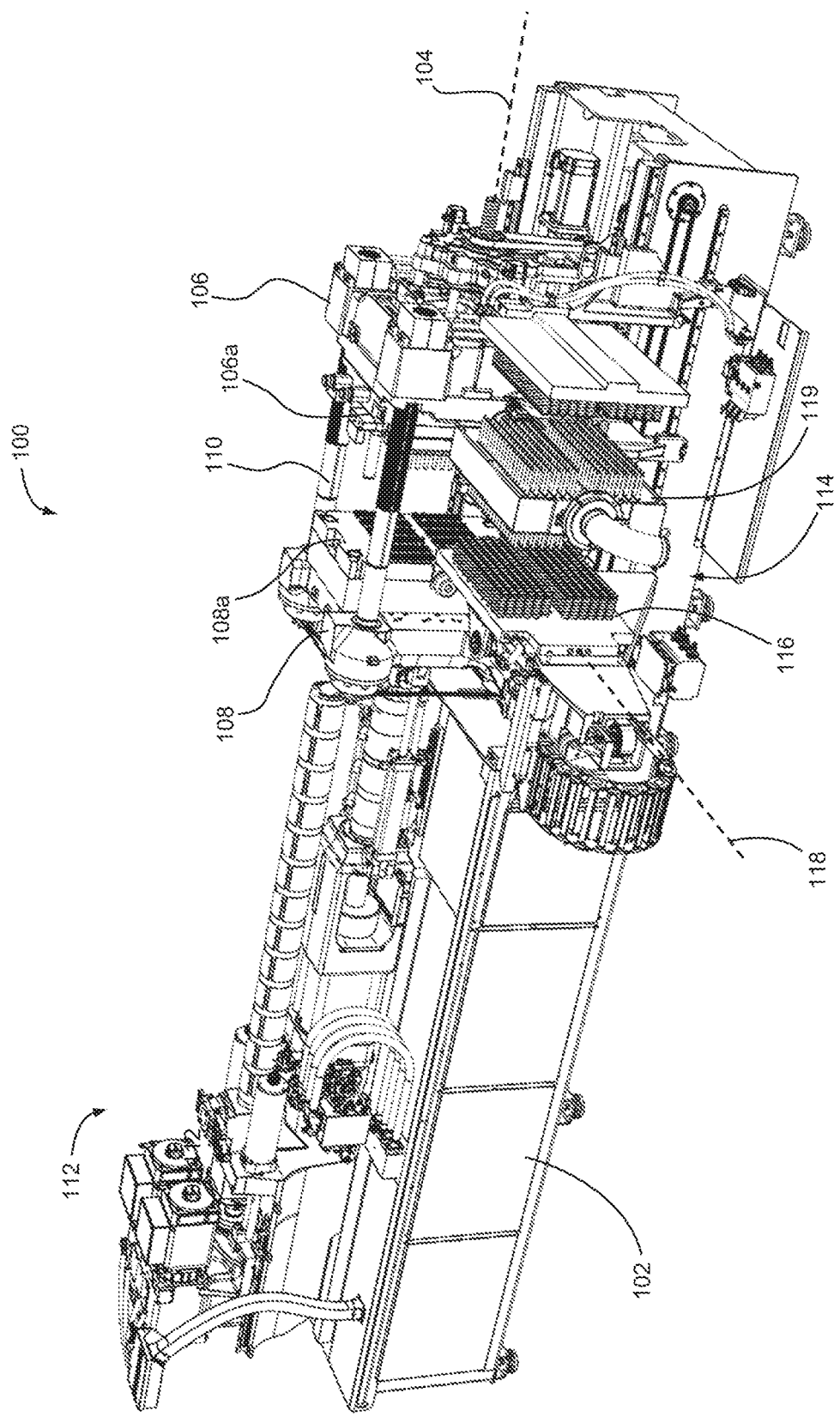
FIG. 1 is a perspective view, taken from the non-operator side, of an example injection molding machine shown in a mold-open condition.

Referring to FIG. 1, an example of an injection molding machine 100 includes a base 102 extending lengthwise along a generally horizontal machine axis 104. A movable platen 106 is slidably supported by the base 102 for holding a first mold section 106a, and a stationary platen 108 is fixed to the base 102 for holding a second mold section 108a. The movable platen 106 is translatable towards and away from the stationary platen 108 along the machine axis 104 for closing and opening a mold formed by the first and second mold sections 106a, 108a.

Figure 3:
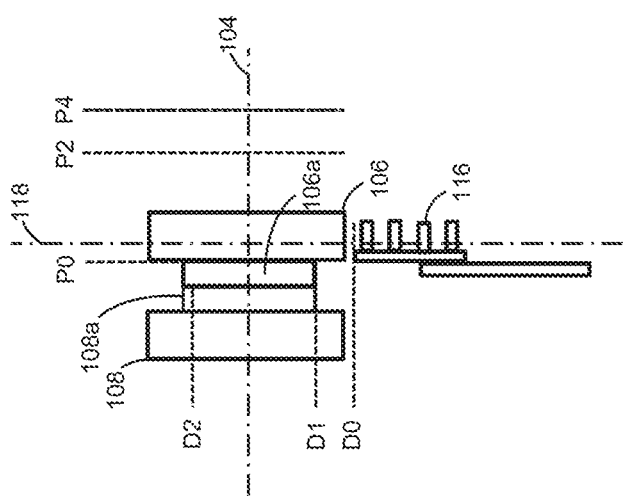
FIG. 3 is a schematic representation showing relative positions of the platen and take-out device structures at the time identified at "FIG. 3" in FIGS. 2A and 2B.
Figure 4:
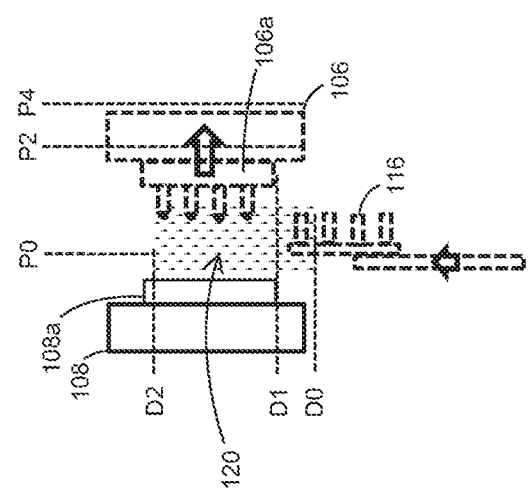
FIG. 4 is a schematic representation showing relative positions of the platen and take-out device structures at the time identified at "FIG. 4" in FIGS. 2A and 2B.
Figure 5:
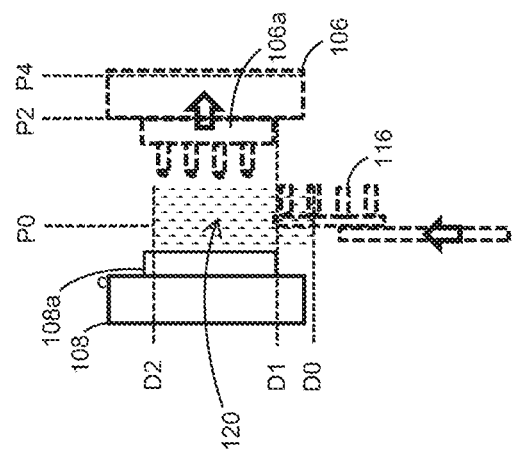
FIG. 5 is a schematic representation showing relative positions of the platen and take-out device structures at the time identified at "FIG. 5" in FIGS. 2A and 2B.
Figure 6:
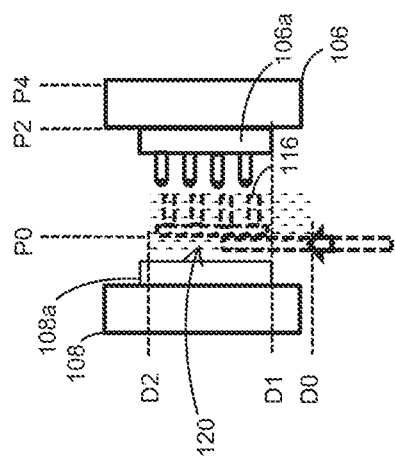
FIG. 6 is a schematic representation showing relative positions of the platen and take-out device structures at the time identified at "FIG. 6" in FIGS. 2A and 2B.
Figure 7:
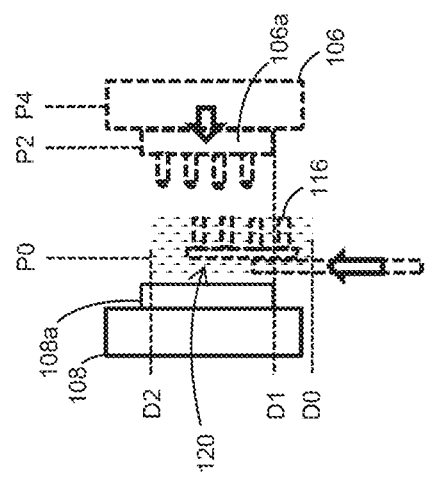
FIG. 7 is a schematic representation showing relative positions of the platen and take-out device structures at the time identified at "FIG. 7" in FIGS. 2A and 2B.
Figure 8:
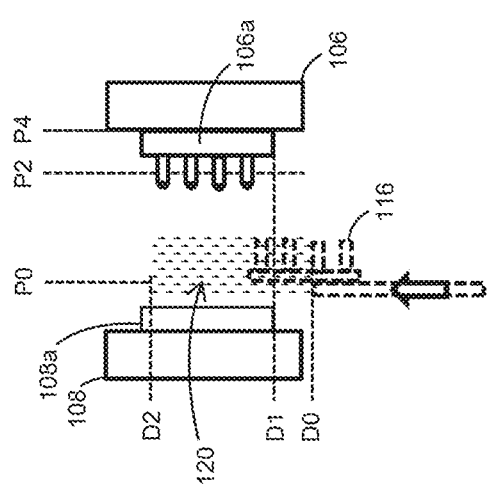
FIG. 8 is a schematic representation showing relative positions of the platen and take-out device structures at the time identified at "FIG. 8" in FIGS. 2A and 2B.
Figure 9:
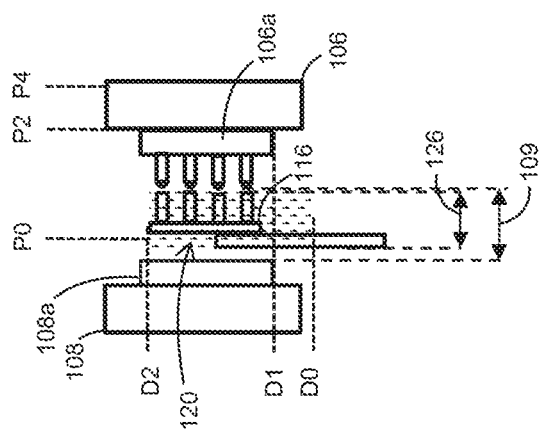
FIG. 9 is a schematic representation showing relative positions of the platen and take-out device structures at the time identified at "FIG. 9" in FIGS. 2A and 2B.

In the example illustrated, the movable platen 106 is translatable along the machine axis 104 among at least a mold-closed position P0 (FIG. 3), an over-travel position P4 (FIG. 6) spaced axially apart from the mold-closed position P0 in an opening direction, and a transfer position P2 (FIG. 9) axially intermediate the mold-closed and over-travel positions P0, P4 for transferring molded articles from the first mold section 106a. Referring to FIG. 3, when the movable platen 106 is in the mold-closed position P0, the first and second mold sections 106a, 108a abut and the mold is closed. Referring to FIG. 9, when the movable platen 106 is in the transfer position P2, the first and second mold sections 106a, 108a are spaced axially apart by a clearance spacing 109 and the mold is open.

Referring to FIG. 1, a plurality of tie bars 110 extend parallel to the machine axis 104 between the movable and stationary platens 106, 108 for exerting a clamp load across the first and second mold sections 106a, 108a when the mold is closed. An injection unit 112 is mounted to the base 102 for injecting resin or other mold material into the mold to form molded articles.

In the example illustrated, the machine 100 includes a part-handling apparatus 114 for handling molded articles formed in the mold of the machine 100. The part handling apparatus 114 includes a take-out device 116 for receiving molded articles from the first mold section 106a and moving the molded articles clear of the first and second mold sections 106a, 108a. In the example illustrated, the take-out device 116 is movable between a retracted position D0 (FIG. 3) and an advanced position D2 (FIG. 9) along a generally horizontal take-out device axis 118 generally perpendicular to the machine axis 104. The part-handling apparatus 114 further includes, in the example illustrated, a receiver 119 for receiving molded articles from the take-out device 116. In the example illustrated, the receiver 119 comprises a rotary shell.

Referring to FIG. 3, in the example illustrated, the take-out device 116 is clear of the first and second mold sections 106a, 108a when in the retracted position D0. Referring to FIG. 9, the take-out device 116 reaches between the first and second mold sections 106a, 108a when in the advanced position D2 for receiving molded articles from the first mold section 106a when the movable platen 106 is in the transfer position P2. The take-out device 116 has an axial extent 126 intermediate the first and second mold sections 106a, 108a when in the advanced position D2. The axial extent 126 can be at least 70 percent of the clearance spacing 109.

In the example illustrated, the take-out device 116 sweeps a volume 120 (also referred to as a work envelope 120) when moving between the retracted and advanced positions D0, D2. In some examples, the work envelope 120 may be at least partially defined by outer edges of molded articles that may be held in and protrude from the take-out device 116. In the example illustrated, the movable platen 106 and the first mold section 106a are clear of the work envelope 120 when the movable platen 106 is in the transfer position P2. In some examples, molded articles may be held in and protrude from the first mold section 106a, and outer edges of such molded articles may also be clear of the work envelope 120 when the movable platen 106 is in the transfer position P2.

In use, an analysis of an injection cycle can begin with the movable platen in the mold-closed position P0. The movable platen 106 is releasably locked to the tie bars 110 and a clamp load is exerted across the first and second mold sections 106a, 108a. Resin is injected into the mold while sufficient clamp load is applied across the mold. After injection, the clamp pressure holding the first and second mold sections 106a, 108a closed is released. After the clamp pressure is released, the movable platen 106 is translated to the transfer position P2, and the take-out device 116 is moved to the advanced position D2. When the movable platen 106 is in the transfer position P2 and the take-out device 116 is in the advanced position D2, the molded articles are transferred from the first mold section 106a to retained engagement on the take-out device 116. The take-out device 116 is then moved clear of the first and second mold sections 106a, 108a (e.g., past a mold section boundary shown schematically as line D1), and the movable platen 106 is translated back to the mold-closed position P0 for a subsequent injection cycle.

Figure 2:
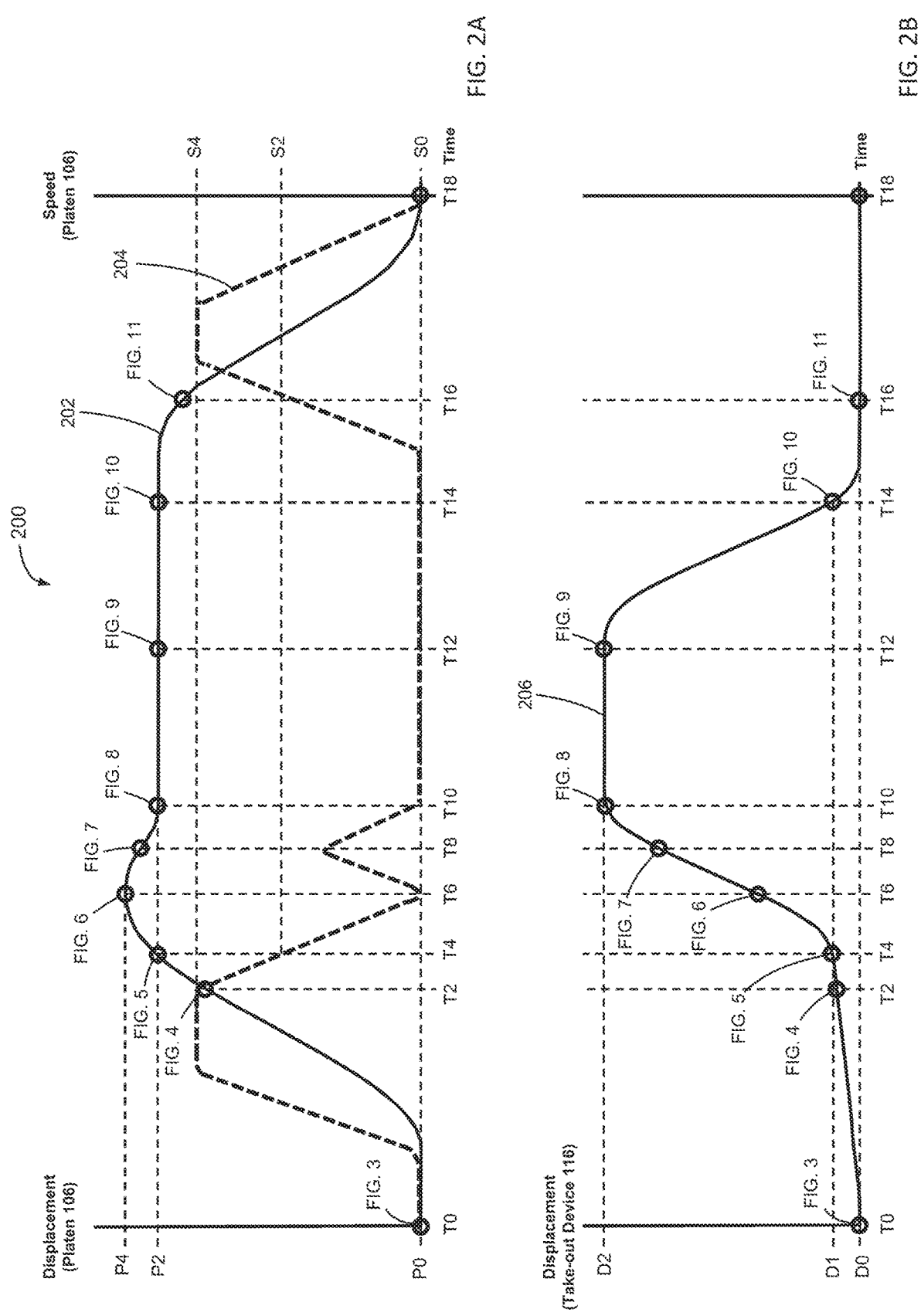
FIG. 2A is a graph showing displacement and speed with respect to time of a platen structure of the machine of FIG. 1 according to an example method.
FIG. 2B is a graph showing corresponding displacement with respect to time of a take-out device structure of the machine of FIG. 1 according to the method of FIG. 2A.

Referring to FIGS. 2A and 2B, an example method 200 of operating the machine 100, and coordinating movement of the movable platen 106 and the take-out device 116, is illustrated graphically. The method 200 can, in some examples, help to reduce cycle time and/or increase positioning accuracy of components of the machine 100. Referring to FIG. 2A, in the example illustrated, displacement curve 202 and speed curve 204 illustrate displacement and speed, respectively, of the movable platen 106 with respect to time according to the method 200. Referring to FIG. 2B, in the example illustrated, displacement curve 206 illustrates corresponding displacement of the take-out device 116 with respect to time according to the method 200.

Referring further to FIG. 2A and FIGS. 3 to 6, after the clamp pressure is released, the movable platen 106 is translated in the opening direction from the mold-closed position P0 to the over-travel position P4. Referring to FIGS. 2A and 6 to 9, after reaching the over-travel position P4, the movable platen 106 is translated in a closing direction opposite the opening direction from the over-travel position P4 to the transfer position P2. Referring to FIGS. 2B and 3 to 9, the take-out device 116 is moved from the retracted position D0 to the advanced position D2, and the molded articles are transferred from the first mold section 106a to the take-out device 116. The molded articles are received in retained engagement in the take-out device 116 when the take-out device 116 is in the advanced position D2 and the movable platen is in the transfer position D2.

Translating the movable platen 106 from the mold-closed position P0 to the over-travel position P4 may permit the movable platen 106 (and the first mold section 106a) to clear the work envelope 120 swept by the take-out device 116 sooner than if the movable platen 106 were to translate directly (i.e. in the opening direction only) from the mold-closed position P0 to a stop at the transfer position P2. Clearing the work envelope 120 sooner may facilitate earlier advancement of the take-out device 116 between the first and second mold sections 106a, 108a and earlier transfer of the molded articles to the take-out device 116, which in turn may facilitate an overall reduction in cycle time of the machine 100. Additionally or alternatively, achieving target positions from the same direction may help compensate for any lash in the movable platen actuator, which may help to improve positioning accuracy of the movable platen 106.

Referring to FIGS. 2A and 4 to 6, in the example illustrated, the movable platen 106 has a maximum opening speed S4 during a portion of the translation in the opening direction to the over-travel position P4. In the example illustrated, the movable platen 106 is decelerated from the maximum opening speed S4 to zero speed S0 at the over-travel position P4 during a portion of the translation in the opening direction to the over-travel position P4 (between time T2 and T6, in the example illustrated).

Referring again to FIG. 2A, in the example illustrated, deceleration of the movable platen 106 is initiated prior to the movable platen 106 reaching the transfer position P2 during translation of the movable platen 106 from the mold-closed position P0 to the over-travel position P4. In the example illustrated, deceleration of the movable platen 106 is initiated prior to the first mold section 106a clearing the work envelope 120 during translation from the mold-closed position P0 toward the over-travel position P4. Deceleration of the movable platen 106 during translation from the mold-closed position P0 to the over-travel position P4 is initiated at time T2 in the example illustrated.

In the example illustrated, during translation from the mold-closed position P0 to the over-travel position P4, the movable platen 106 is translated across the transfer position P2 at a transfer position opening speed S2. In the example illustrated, the transfer position opening speed S2 is less than the maximum opening speed S4. The transfer position opening speed S2 can be at least 50 percent of the maximum opening speed S4.

In some examples, deceleration of the movable platen 106 may be initiated after the first mold section 106a (including any molded articles protruding therefrom) clears the work envelope 120 and prior to the movable platen 106 reaching the transfer position P2 during translation to the over-travel position P4. In some examples, deceleration of the movable platen 106 may be initiated when the movable platen 106 reaches the transfer position P2.

Referring to FIGS. 2A and 2B, in the example illustrated, at least a portion of the translation of the movable platen 106 in the opening direction from the transfer position P2 to the over-travel position P4 (i.e. between time T4 and T6) occurs simultaneously with at least a portion of the movement of the take-out device 116 between the first and second mold sections 106a, 108a toward the advanced position D2. In the example illustrated, at least a portion of the translation of the movable platen 106 in the closing direction from the over-travel position P4 to the transfer position P2 (i.e. between time T6 and T10) occurs simultaneously with at least a portion of the movement of the take-out device 116 between the first and second mold sections 106a, 108a toward the advanced position D2.

In the example illustrated, the take-out device 116 has a maximum advancing speed during a portion of the movement to the advanced position. The maximum advancing speed is represented in FIG. 2B by the speed of the take-out device 116 at, for example, time T6. The take-out device 116 is decelerated from the maximum advancing speed to zero speed at the advanced position D2. In the example illustrated, the deceleration of the take-out device 116 from the maximum advancing speed to zero speed at the advanced position D2 is initiated during translation of the movable platen 106 in the closing direction from the over-travel position P4 to the transfer position P2.

In the example illustrated, the movable platen 106 reaches the transfer position P2 from the over-travel position P4 (at time T10, in the example illustrated) prior to the take-out device 116 reaching the advanced position D2. In some examples, the movable platen 106 and the take-out device 116 may reach respective transfer and advanced positions P2, D2 within less than 200 milliseconds of one another. In some examples, the take-out device 116 may reach the advanced position D2 prior to the movable platen 106 reaching the transfer position P2 from the over-travel position P4.

Referring to FIG. 2A, in the example illustrated, ejection of the molded articles from the first mold section 106a is initiated during translation of the movable platen 106 in the closing direction from the over-travel position P4 to the transfer position P2. In the example illustrated, ejection of the molded articles from the first mold section 106a is initiated prior to the movable platen 106 reaching the transfer position P2 from the over-travel position P4. In the example illustrated, ejection of the molded articles from the first mold section 106a is initiated prior to the take-out device 116 reaching the advanced position D2. Initiating ejection of the molded articles may include, for example, priming ejection actuators of the first mold section 106a so that the molded articles are, for example, ready for transfer to retained engagement on the take-out device 116 when the take-out device 116 reaches the advanced position D2.

Figure 11:
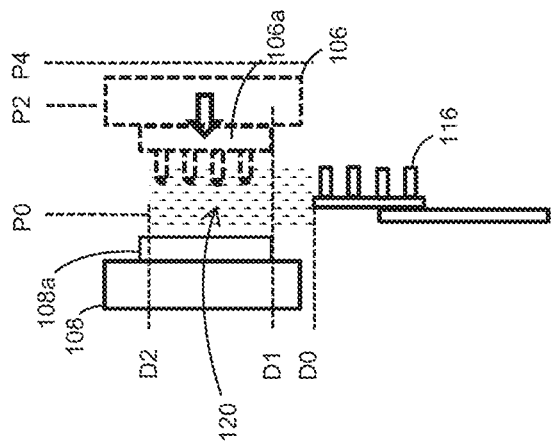
FIG. 11 is a schematic representation showing relative positions of the platen and take-out device structures at the time identified at "FIG. 11" in FIGS. 2A and 2B.
Figure 10:
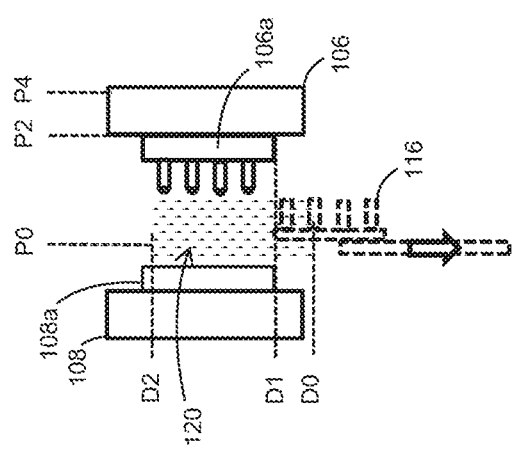
FIG. 10 is a schematic representation showing relative positions of the platen and take-out device structures at the time identified at "FIG. 10" in FIGS. 2A and 2B.

Referring to FIG. 10, in the example illustrated, after the molded articles are transferred to retained engagement on the take-out device 116, the take-out device 116 is moved from the advanced position D2 toward the retracted position D0. Referring to FIG. 11, after the take-out device 116 is clear of the first and second mold sections 106a, 108a (e.g. the take-out device 116 clears the mold section boundary D1), the movable platen 106 is translated in the closing direction from the transfer position P2 to the mold-closed position P0 for a subsequent injection cycle.

Referring to FIGS. 12A and 12B, an alternative example method 300 for operating the injection molding machine 100, and for coordinating movement of the movable platen 106 and the take-out device 116, is illustrated graphically. The method 300 can, in some examples, help to reduce cycle time and/or increase positioning accuracy and components of the machine 100. In the example illustrated, the method 300 has similarities to the method 200, and like features are identified by like reference characters. One notable difference is that the method 300 includes, after the molded articles are transferred to the take-out device 116, using the time required for the take-out device 116 to clear the mold area to provide the moving platen 106 with a closing speed at the transfer position P2 that is greater than zero.

Referring to FIG. 12A, in the example illustrated, displacement curve 302 illustrates displacement of the movable platen 106 with respect to time according to the method 300. Referring to FIG. 12B, in the example illustrated, displacement curve 306 illustrates corresponding displacement of the take-out device 116 with respect to time according to the method 300.

The method 300 can optionally include portions of the method 200. For example, the method 300 can optionally include translation of the movable platen 106 in the opening direction from the mold-closed position P0 to the over-travel position P4, and subsequent translation of the movable platen 106 in the closing direction from the over-travel position P4 to the transfer position P2 for transferring the molded articles to retained engagement on the take-out device 116.

Figure 13:
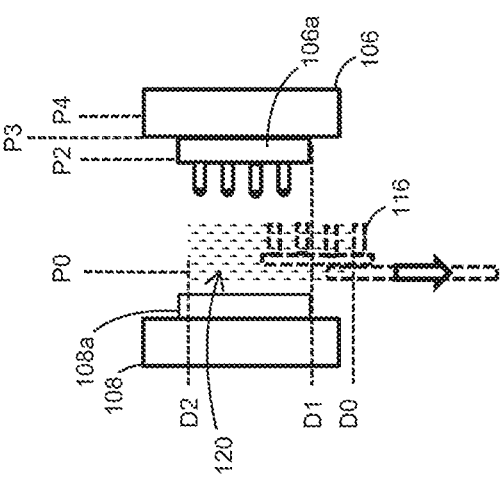
FIG. 13 is a schematic representation showing relative positions of the platen and take-out device structures at the time identified at "FIG. 13" in FIGS. 12A and 12B.

Referring to FIG. 13, in the example illustrated, after the molded articles are transferred to retained engagement on the take-out device 116, the take-out device 116 is moved from the advanced position D2 to the retracted position D0. The method 300 includes translating the movable platen 106 in the opening direction from the transfer position P2 to a pre-closing position P3 spaced axially apart from the transfer position P2 during movement of the take-out device 116 toward the retracted position D0. In the example illustrated, the pre-closing position P3 is axially intermediate the transfer position P2 and the over-travel position P4.

Figure 15:
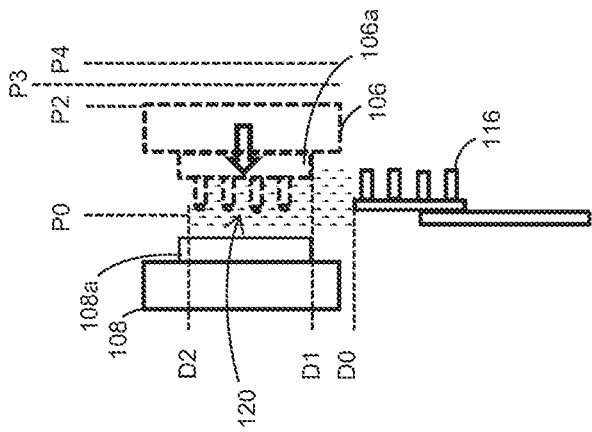
FIG. 15 is a schematic representation showing relative positions of the platen and take-out device structures at the time identified at "FIG. 15" in FIGS. 12A and 12B.
Figure 14:
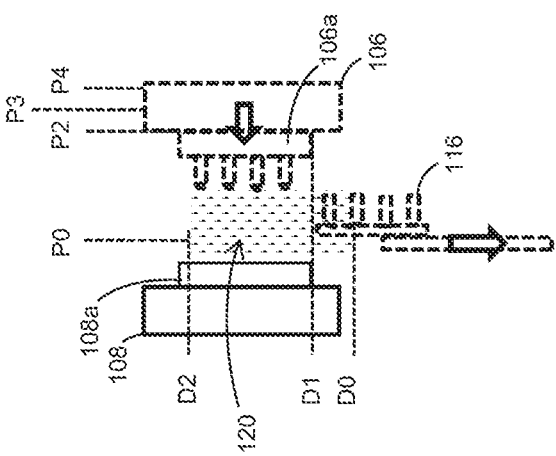
FIG. 14 is a schematic representation showing relative positions of the platen and take-out device structures at the time identified at "FIG. 14" in FIGS. 12A and 12B.

Referring to FIGS. 14 and 15, in the example illustrated, after reaching the pre-closing position P3, the movable platen 106 is translated in the closing direction from the pre-closing position P3 to the mold-closed position P0. In the example illustrated, at least a portion of the translation of the movable platen 106 from the pre-closing position P3 to the mold-closed position P0 occurs prior to the take-out device 116 clearing the first and second mold sections 106a, 108a when moving toward the retracted position D0.

Referring to FIG. 14, in the example illustrated, during translation from the pre-closing position P3 to the mold-closed position P0, the movable platen 106 is translated across the transfer position P2 at a transfer position closing speed. The transfer position closing speed is generally equal to a maximum speed of the movable platen 106 when translating from the pre-closing position P3 to the transfer position P2, and is represented in FIG. 12A by the speed of the movable platen 106 at, for example, time T15. In the example illustrated, the movable platen 106 is accelerated from zero speed at the pre-closing position P3 to the transfer position closing speed at the transfer position P2.

Figure 17:
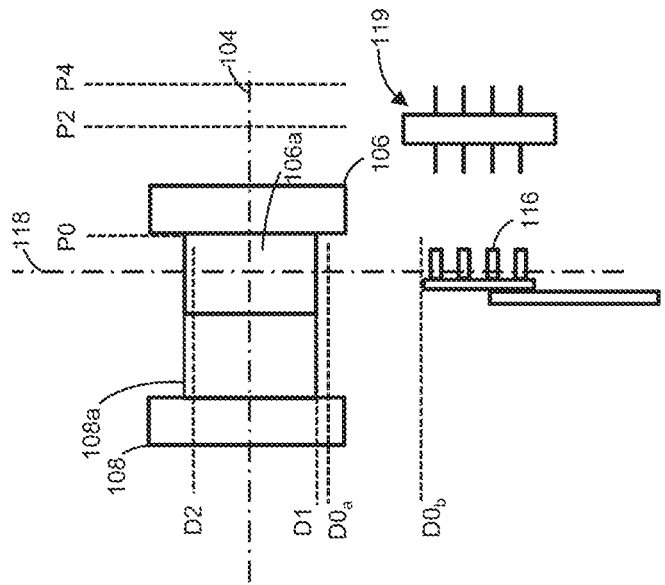
FIG. 17 is a schematic representation similar to FIG. 16, showing the take-out device structure in alignment with a receiver when in an optional second retracted position.
Figure 16:
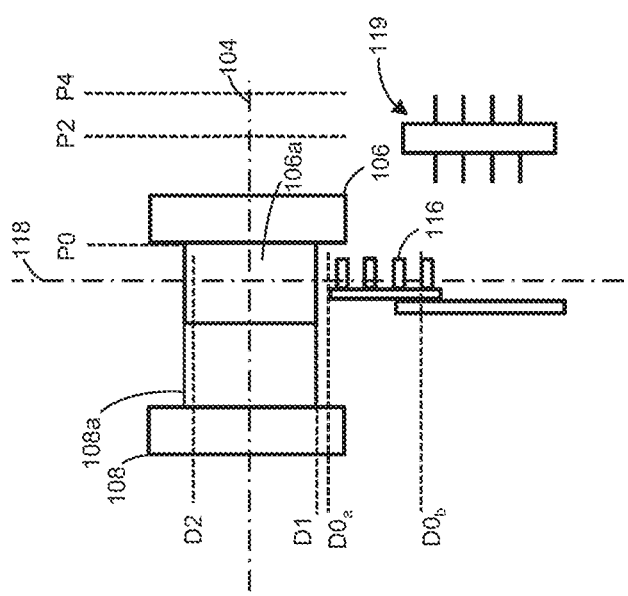
FIG. 16 is a schematic representation similar to FIG. 3, showing a retracted position in an optional alternate position relative to the moving platen envelope.

Referring to FIGS. 16 and 17, an optional modification applicable to either method 200 or 300 is illustrated. In this example, the take-out device 116 is shown having a retracted position $D0_a$ (first retracted position) that is clear of the mold halves 106a, 108a but optionally protrudes into what would normally be the platen work envelope defined by the translation of the moving platen. However, in cases where—such as in the example illustrated—the axial extent (mold height) of the first mold half 106a secured to the movable platen 106 is greater than the axial extent of the take-out device, the abutting mold halves 106a, 108a limit translation of the moving platen in the closing direction, and a space is left in which the leading edge of the take-out device 116 can protrude while waiting for the mold to open. This positioning of the take-out device 116 can put the retracted position D0 closer to the mold envelope, which can reduce the stroke length between the retracted and advanced positions of the take-out device and thereby reduce the time required for the take-out device to reach the advanced position.

FIGS. 16 and 17 also show the take-out device positioned for engagement with the receiver 119 when in the retracted position, and particularly when in an optional second retracted position $D0_b$ in the example illustrated. The second retracted position $D0_b$ is a position along the axis 118, further away from the mold halves 106a, 108a than the first retracted position $D0_a$. In use, after the molded articles (e.g.

preforms in the example illustrated) have been transferred from the first mold half 106a to the take-out device 116, the take-out device 116 can retract to the second retracted position, past the first retracted position. From the second retracted position, the take-out device 116 and receiver 119 can be drawn together and molded articles can be released from the take-out device 116 and retained on the receiver 119. The take-out device 116 can thereafter move to the first retracted position and wait for the mold to open. Optionally, the take-out plate can begin accelerating towards the advanced position from the second retracted position (or any position along the axis 118 spaced further away from the mold section boundary D1) so that the take-out device 116 can cross the mold section boundary D1 with speed as soon as the mold halves are open enough to accommodate the take-out device 116 between them.

What is claimed is:

1. A method of operating an injection molding machine, the method comprising:
    a) releasing a clamp pressure, the clamp pressure holding a first mold section and a second mold section together, the first mold section mounted to a movable platen and the second mold section mounted to a stationary platen;
    b) translating the movable platen in an opening direction away from the stationary platen to open the mold, the translating step including translating the movable platen from a mold-closed position to an over-travel position spaced axially apart from the mold-closed position;
    c) translating the movable platen in a closing direction opposite the opening direction from the over-travel position to a transfer position axially intermediate the mold-closed position and the over-travel position;
    d) moving a take-out device from a retracted position to an advanced position, the take-out device clear of the first and second mold sections when in the retracted position, and the take-out device reaching between the first and second mold sections when in the advanced position for receiving articles from the first mold section when the movable platen is in the transfer position; and
    e) transferring articles from the first mold section to the take-out device, the articles received in retained engagement in the take-out device when the take-out device is in the advanced position and the movable platen is in the transfer position.

2. The method of claim 1, wherein the movable platen has a maximum opening speed in step (b), and step (b) includes decelerating the movable platen from the maximum opening speed to zero speed at the over-travel position.

3. The method of claim 2, wherein step (b) includes crossing the transfer position when translating in the opening direction towards the over-travel position, and initiating the decelerating of the movable platen prior to the movable platen reaching the transfer position when translating in the opening direction.

4. The method of claim 3, wherein step (b) includes translating the movable platen across the transfer position at a transfer position opening speed, the transfer position opening speed at least 50 percent of the maximum opening speed.

5. The method of claim 2, wherein the take-out device sweeps a work envelope when moving between the advanced and retracted positions, and step (b) includes initiating the decelerating of the movable platen prior to the first mold section clearing the work envelope.

6. The method of claim 1, wherein at least a portion of the translation of the movable platen from the transfer position to the over-travel position in step (b) occurs simultaneously with at least a portion of the movement of the take-out device between the first and second mold sections in step (d).

7. The method of claim 1, wherein at least a portion of the translation of the movable platen from the over-travel position to the transfer position in step (c) occurs simultaneously with at least a portion of the movement of the take-out device between the first and second mold sections in step (d).

8. The method of claim 1, wherein the take-out device has a maximum advancing speed in step (d), and step (d) includes initiating deceleration of the take-out device from the maximum advancing speed to zero speed at the advanced position during translation of the movable platen in step (c).

9. The method of claim 1, further comprising initiating ejection of the molded articles from the first mold section prior to the movable platen reaching the transfer position in step (c).

10. The method of claim 1, wherein when the movable platen is in the transfer position, the first and second mold sections are spaced axially apart by a clearance spacing, and wherein the take-out device has an axial extent intermediate the first and second mold sections when in the advanced position, the axial extent at least 70 percent of the clearance spacing.

11. The method of claim 1, further comprising:
    f) after step (e), moving the take-out device from the advanced position to the retracted position;
    g) during step (f), translating the movable platen in the opening direction from the transfer position to a pre-closing position spaced axially apart from the transfer position; and
    h) after step (g), translating the movable platen in the closing direction from the pre-closing position to the mold-closed position, wherein at least a portion of the translation of the movable platen in step (h) occurs prior to the take-out device clearing the first and second mold sections during step (f).

12. The method of claim 11, wherein the pre-closing position is axially intermediate the transfer position and the over-travel position.

13. The method of claim 11, wherein step (h) includes translating the movable platen across the transfer position at a transfer position closing speed, the transfer position closing speed generally equal to a maximum speed of the movable platen when translating from the pre-closing position to the transfer position in step (h).

14. The method of claim 13, wherein step (h) includes accelerating the movable platen from zero speed at the pre-closing position to the transfer position closing speed at the transfer position.

15. A method of operating an injection molding machine, the method comprising:
    a) translating a movable platen in a closing direction towards a stationary platen, from an over-travel position to a transfer position; and
    b) when the movable platen is in the transfer position, transferring molded articles from a first mold section mounted to the movable platen to retained engagement on a take-out device reaching between the platens.

16. The method of claim 15, wherein the transfer position in step (b) is achieved as a result of completion of step (a).

17. The method of claim 15, wherein after step (b), the movable platen is translated further in the closing direction to a mold-closed position for forming a subsequent set of articles.

18. The method of claim 15, wherein prior to step (a), the movable platen is translated in an opening direction across the transfer position at a transfer position opening speed, the opening direction opposite the closing direction.

19. A method of operating an injection molding machine, the method comprising:
   a) releasing a clamp pressure, the clamp pressure holding a first mold section and a second mold section together, the first mold section mounted to a movable platen and the second mold section mounted to a stationary platen;
   b) translating the movable platen from a mold-closed position to a transfer position to open the mold, the transfer position spaced axially apart from the mold-closed position in an opening direction;
   c) moving a take-out device from a retracted position to an advanced position, the take-out device clear of the first and second mold sections when in the retracted position, and the take-out device reaching between the first and second mold sections when in the advanced position for receiving articles from the first mold section when the movable platen is in the transfer position;
   d) transferring articles from the first mold section to the take-out device, the articles received in retained engagement in the take-out device when the take-out device is in the advanced position and the movable platen is in the transfer position;
   e) after step (d), moving the take-out device from the advanced position to the retracted position;
   f) during step (e), translating the movable platen in the opening direction from the transfer position to a pre-closing position spaced axially apart from the transfer position; and
   g) after step (f), translating the movable platen in a closing direction opposite the opening direction from the pre-closing position to the mold-closed position, wherein at least a portion of the translation of the movable platen in step (g) occurs prior to the take-out device clearing the first and second mold sections during step (e).

20. The method of claim 19, wherein step (g) includes translating the movable platen across the transfer position at a transfer position closing speed, the transfer position closing speed generally equal to a maximum speed of the movable platen when translating from the pre-closing position to the transfer position in step (g).

21. The method of claim 20, wherein step (g) includes accelerating the movable platen from zero speed at the pre-closing position to the transfer position closing speed at the transfer position.

22. A method of operating an injection molding machine, the method comprising:
   a) translating a movable platen in a closing direction to a mold-closed position for closing a mold;
   b) after step (a), translating the movable platen in an opening direction away from the stationary platen; and
   c) after step (b), translating the movable platen in the closing direction toward a transfer position, the transfer position for transferring molded articles from a mold section held by the movable platen to retained engagement on a take-out device reaching between the platens.

23. The method of claim 22, wherein step (b) includes translating the movable platen from the mold-closed position to an over-travel position spaced axially apart from the mold-closed position, and step (c) includes translating the movable platen from the over-travel position to the transfer position.

24. The method of claim 22, wherein step (b) includes translating the movable platen from the transfer position to a pre-closing position spaced axially apart from the transfer position, and step (c) includes translating the movable platen from the pre-closing position to the transfer position, the movable platen reaching the transfer position in step (c) at a transfer position closing speed, the transfer position closing speed generally equal to a maximum speed of the movable platen during translation from the pre-closing position to the transfer position in step (c).

* * * * *